United States Patent [19] [11] Patent Number: 4,901,172
Nakazawa et al. [45] Date of Patent: Feb. 13, 1990

[54] RECORDING/PLAYBACK APPARATUS WITH AUTO-CHANGER

[75] Inventors: Makoto Nakazawa; Takao Miyazaki; Mitsuo Soumi, all of Tokyo, Japan

[73] Assignee: Fuji Photo Film Co., Ltd., Kanagawa, Japan

[21] Appl. No.: 191,938

[22] Filed: May 9, 1988

[30] Foreign Application Priority Data

May 8, 1987 [JP] Japan ................................ 62-110484
May 8, 1987 [JP] Japan ................................ 62-110485
Aug. 18, 1987 [JP] Japan ................................ 62-200796
Sep. 11, 1987 [JP] Japan ................................ 62-226499
Sep. 11, 1987 [JP] Japan ................................ 62-226500

[51] Int. Cl.$^4$ ........................................... G11B 5/012
[52] U.S. Cl. ................................ 360/98.05; 360/98.04; 360/99.06; 369/37
[58] Field of Search ............... 360/97.01, 98.01, 98.04, 360/98.05, 98.06, 98.07, 99.08, 99.12, 91, 92; 369/30, 34–39, 178

[56] References Cited

U.S. PATENT DOCUMENTS

| 3,682,480 | 8/1972 | Ban | 360/92 |
| 3,693,981 | 9/1972 | Ban | 360/92 |
| 4,044,391 | 8/1977 | Takahashi | 360/105 |
| 4,071,857 | 1/1978 | Whitney et al. | 360/105 |
| 4,670,866 | 6/1987 | Hasegawa et al. | 369/37 |
| 4,768,116 | 8/1988 | Watanabe | 360/98.06 |

FOREIGN PATENT DOCUMENTS 61-267965 11/1986 Japan .

Primary Examiner—Stuart N. Hecker
Assistant Examiner—David J. Severin
Attorney, Agent, or Firm—Sughrue, Mion, Zinn, Macpeak & Seas

[57] ABSTRACT

A plurality of buckets are fixedly provided on a different rotary body at predetermined angular intervals, and a disc-shaped recording medium is capable of being loaded into each bucket. A recording/playback position is situated at a predetermined angular position with respect to the rotary body, and drive units capable of freely approaching and separating from a bucket from upper and lower sides of the bucket are provided at the recording/playback position.

12 Claims, 15 Drawing Sheets

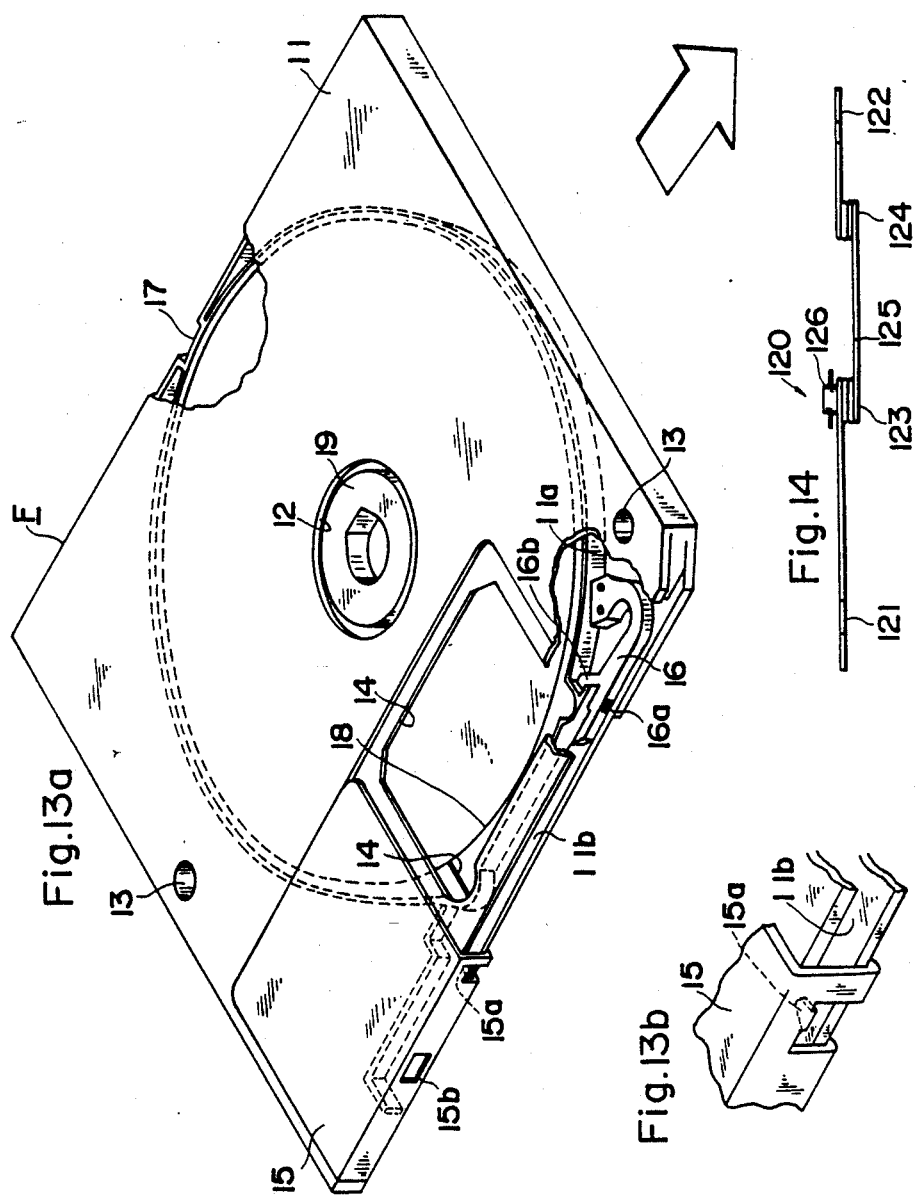

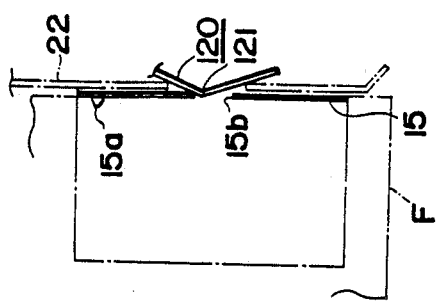
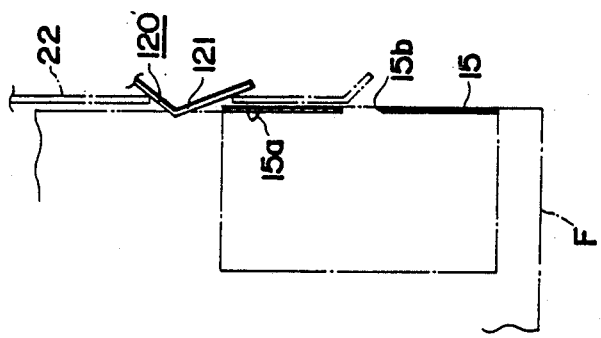
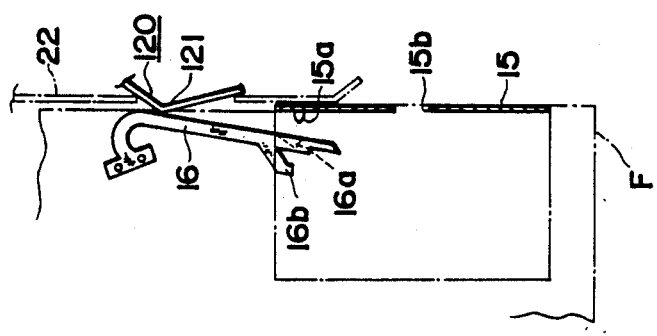
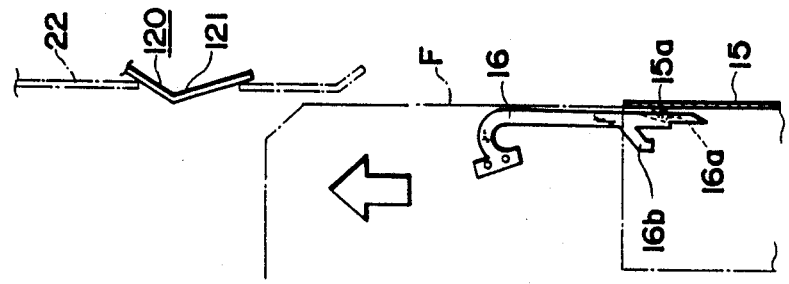

RECORDING/PLAYBACK APPARATUS WITH AUTO-CHANGER

BACKGROUND OF THE INVENTION

1. Field of the Invention

This invention relates to recording/playback apparatus such as a magnetic recording/playback apparatus in which a magnetic recording/playback head is moved radially of a rotating magnetic disc to record a signal on any track, play back a signal from any track or perform both recording and playback, and an optical recording/playback apparatus which includes an optical pick-up for similarly performing recording/playback using an optical disc or a photomagnetic disc. More particularly, the invention relates to a recording/playback apparatus including an auto-changer capable of holding a number of disc-shaped recording media, moving these recording media automatically to a recording/playback position, and exchanging one recording media for another that is to be subjected to recording/playback.

2. Description of the Prior Art

The present invention relates to electronic still video cameras which electronically photograph a subject and record the resulting still image on a magnetic recording medium, other types of magnetic recording apparatus, magnetic playback apparatus which read a still video signal recorded on a magnetic recording medium and reproduce the signal on a television screen, and magnetic recording/playback apparatus which possess both recording and playback functions. Only one magnetic recording medium is capable of being loaded in any of these apparatus. Therefore, when a magnetic recording medium which has been recorded on or played back from is to be exchanged for another, it is necessary to remove the magnetic recording medium set in the apparatus and load the other magnetic recording medium in its place.

In order to perform this operation efficiently, an apparatus equipped with a freely movable magazine capable of holding a plurality of magnetic recording media has been proposed. For example, see the specification of Japanese Patent Application Laid-Open (KOKAI) No. 60-243851. The magazine accommodates a plurality of magnetic recording media in an upright state and is moved and positionally controlled by a movement drive mechanism in such a manner that a prescribed magnetic recording medium or an empty location on the magazine will arrive at a predetermined position (a position at which one magnetic recording medium can be exchanged for another). When a magnetic recording medium which has been recorded on or played back from is to be exchanged for another by utilizing this magazine, it is necessary to (1) remove the magnetic recording medium from the recording/playback section and place it in a predetermined empty accommodating location of the magazine, (2) move the magazine until the magnetic recording medium to be used next arrives at the exchange position, and (3) extract the new magnetic recording medium from the magazine and load it into the recording/playback section. Thus, exchanging magnetic recording media is a time-consuming operation.

Accordingly, there is need of a device, referred to as an "auto-changer", that has the capability of performing an exchange among a plurality of recording media rapidly and automatically.

SUMMARY OF THE INVENTION

An object of the present invention is to provide a recording/playback apparatus having an auto-change function capable of performing an exchange among a plurality of recording media rapidly and automatically.

Another object of the present invention is to provide a setting device of a drive unit particularly useful for realizing a recording/playback apparatus in which a plurality of recording media can be changed rapidly and automatically.

Still another object of the present invention is to provide a setting device for a recording/playback section in an auto-changer in which, when a portion for driving a disc-shaped recording medium is set on the disc-shaped recording medium, the setting operation can be performed quickly with little likelihood of impact even if the drive portion is moved a long distance.

A further object of the present invention is to provide an auto-changer in which a recording medium is readily loaded on and unloaded from a moving body such as a rotary body.

A recording/playback apparatus in accordance with the present invention comprises a rotary body on which a plurality of buckets each holding a recording medium are fixedly arranged at predetermined angular intervals circumferentially of the rotary body, and two types of drive units provided at a predetermined angular position with respect to the rotary body and arranged to freely approach and separate from a bucket at this position from both sides thereof for rotatively driving the recording medium held by said bucket and subjecting the recording medium to recording/playback.

Conceptually speaking, the recording/playback apparatus refers to a recording apparatus, a playback apparatus and an apparatus capable of both recording and playback. The recording medium may be a magnetic disc, an optical disc, a photomagnetic disc, etc. It goes without saying that optical discs include those on which data and the like are expressed by the positions and lengths of pits, and those on which data and signals are expressed by the positions and combinations of light-permeable and light-shielding elements.

In a case where the invention is applied to a magnetic recording/playback apparatus, one of the drive units is equipped with a rotary drive device which includes a motor for rotatively driving a magnetic recording medium, and a transfer device for transferring a magnetic head for magnetic recording/playback, and the other of the drive units is equipped with a retaining plate mechanism including a retaining plate for maintaining the magnetic head in excellent contact with the magnetic recording medium.

In accordance with the invention, when a recording medium accommodated in a bucket arrives at the aforementioned predetermined angular position (the recording/playback position), the two drive units are moved toward the recording medium to embrace the same and perform recording/playback. When the recording/playback operation for this particular recording medium ends, the drive units are separated from the recording medium, the next recording medium is brought to the recording/playback position by subsequently rotating the rotary body, and recording/playback is performed in similar fashion.

In accordance with the invention, if a recording medium is loaded into each of the plurality of buckets on the rotary body, recording/playback operations can be performed successively for the plurality of recording media in the manner set forth above. It is possible to change recording media that are to be subjected to the recording/playback operation without human intervention. This is convenient for recording/playback of a large number of still pictures or for recording/playback performed over a long period of time. Since a recording medium is loaded into a bucket secured to the rotary body and need not be moved or manipulated at the recording/playback position, the construction of the rotary body holding the recording media can be simplified. In addition, since recording media are exchanged by moving the drive units toward and away from each other and rotating the rotary body, the exchange can be performed in rapid fashion.

A setting device for drive units in a recording/playback apparatus in accordance with the invention comprises: a first support body for supporting a first drive unit which includes a rotative drive device including a motor for rotatively driving a recording medium and a recording/playback head transfer device, the first support body being pivotally secured at one end thereof for free swinging motion; a second support body for supporting a second drive unit having a retaining plate mechanism which includes a retaining plate for maintaining the magnetic head in excellent contact with the recording medium, the second support body being pivotally secured at one end thereof for free swinging motion; and a synchronous driving mechanism for swingingly driving the first and second support bodies toward and away from each other about respective pivot points thereof.

In accordance with the invention, the recording medium is fixed and the first and second drive units can be moved so as to embrace the recording medium from both sides thereof. This makes it possible to perform chucking on a motor spindle and to make the magnetic head, retaining plate and the like approach the recording medium. Therefore, when the drive unit setting device of the invention is used, it is possible to attain an auto-changer function merely by performing the recording medium exchange operation, namely moving the recording medium horizontally to or from the recording/playback position. Moreover, since the setting device according to the invention is such that the first and second support bodies are swung synchronously, a single drive source is sufficient for moving the support bodies. Since the drive units are adapted to approach both surfaces of the recording medium simultaneously and to separate from both surfaces simultaneously, the setting operation is performed rapidly.

A setting device for a recording/playback section in an auto-changer according to the present invention comprises: a recording/playback section having a first support body equipped with a recording/playback mechanism which includes a recording/playback head and a spindle motor for rotatively driving a recording medium, the first support body being pivotally secured at one end thereof for free swinging motion, and a second support body equipped with a retaining plate mechanism which includes a retaining plate, the second support body being pivotally secured at one end thereof for free swinging motion, the first and second support bodies being adapted so as to perform swinging motion synchronously toward or away from each other about respective pivot points thereof; a link member having one end thereof freely rotatably connected to the first or second support body at a suitable location thereon, and having another end which undergoes linear motion along a predetermined path, thereby swinging the support body to which the link member is connected; and a drive mechanism for reciprocating the other end of the link member linearly along the predetermined path.

In accordance with the invention, when the link member is driven by the drive mechanism so that the other end thereof moves linearly along the predetermined path, the support body connected to the link member is swung about its pivot point. Owing to the reciprocating motion of this other end of the link member along the predetermined path, the first and second support bodies move toward and away from each other synchronously.

Even if the link member is driven by the drive mechanism in such a manner that the aforementioned other end thereof moves at a constant speed, the speed at which the end of the link member connected to the support body moves changes, so that the first and second support bodies slow down greatly when at positions very close together. Even if the moving speed decided by the drive mechanism is raised, the speed at which the two support bodies approach each other slows down in a range where the two support bodies are very close to each other. Accordingly, even if the distance between the two support bodies is great when the support bodies are spaced apart from each other, the support bodies can be moved at a high speed. When the two support bodies are close together, the support bodies can be moved slowly and gently to set the recording/playback section on a magnetic disc without subjecting the disc to a strong shock. The arrangement is comparatively simple without requiring that a special stopper be provided.

A magnetic disc auto-changer in accordance with the invention comprises a moving body for moving between a recording medium loading/unloading position provided at a first predetermined position and a recording medium recording/playback position provided at a second predetermined position, and mechanisms arranged on the moving body at predetermined intervals for holding respective recording media in a freely loadable/unloadable state, the moving body and each holding mechanism being formed to have a cut-away portion in such a manner that a portion of the recording medium held by the respective holding mechanism is exposed to the outside at both surfaces thereof.

The recording medium holding mechanism may be a bucket structure of a kind illustrated in an embodiment described below, or guide means adapted to simply guide both sides of a recording medium jacket and lock the jacket. Examples of the moving body include a rotary body or a moving body which undergoes linear motion. The rotary body is not limited to a disk, so long as the rotary body rotates and is capable of carrying the holding mechanisms. The recording medium loading/unloading position and the recording/playback position generally are provided at positions spaced apart from each other, though they may be placed at the same position. The cut-away portions have the form of cut-outs in a plate-shaped body and are not provided with parts or other mechanical members. Each single recording medium or the holding mechanism thereof may be provided with the cut-away portion at only one location or at two or more locations if desired.

In accordance with the invention, the cut-away portion exposing a part of the recording medium is formed at the location where the holding mechanism of the moving body is provided. Therefore, the recording medium can be loaded in the holding mechanism of the moving body or extracted from the holding mechanism with ease by grasping a portion of the recording medium by hand or by using some automatic loading/unloading mechanism.

Other features and advantages of the present invention will be apparent from the following description taken in conjunction with the accompanying drawings.

BRIEF DESCRIPTION OF THE DRAWINGS

FIGS. 1 through 6 illustrate an embodiment of the invention, in which:

FIGS. 1 through 3 illustrate the overall mechanical arrangement of a magnetic recording/playback apparatus which includes an auto-changer, in which FIG. 1 is a plan view, FIG. 2 an enlarged sectional view taken along line II—II of FIG. 1, and FIG. 3 a sectional view taken along line III—III of FIG. 1;

FIG. 4 is an enlarged plan view of a recording/playback section; and

FIGS. 5 and 6 are right-side views of the recording/playback section, in which FIG. 5 shows a recording/playback operating state and FIG. 6 shows a disc exchange operating state in which drive units are open, i.e. separated from each other;

FIGS. 8 through 12 illustrate another embodiment of the invention, in which:

FIGS. 8 and 9 illustrate the overall mechanical arrangement of a magnetic recording/playback apparatus which includes an auto-changer, in which FIG. 8 is a plan view and FIG. 9 a sectional view taken along line IX—IX of FIG. 8;

FIG. 10 is an enlarged plan view of a recording/playback section, a portion of which is cut away; FIG. 11 is a view as seen from line XI—XI in FIG. 10, a portion of a side plate being cut away; and FIG. 12 is a graph showing the motion of the upper and lower ends of a link member.

FIGS. 13a–16d show a shutter actuating/locking device, in which FIG. 13a is a perspective view of the construction of a video floppy in enlarged form, FIG. 13b a perspective view showing part of a shutter in enlarged form, FIG. 14 a developed view of a spring, FIG. 15 a plan view showing part of a rotary disk in enlarged form for describing the locking of a video floppy and the actuation of a shutter, and FIGS. 16a–16d views showing the actuation of the shutter in greater detail.

DESCRIPTION OF THE PREFERRED EMBODIMENTS

An embodiment in which the present invention is applied to a magnetic recording/playback apparatus will now be described with reference to the drawings.

Figure 1:
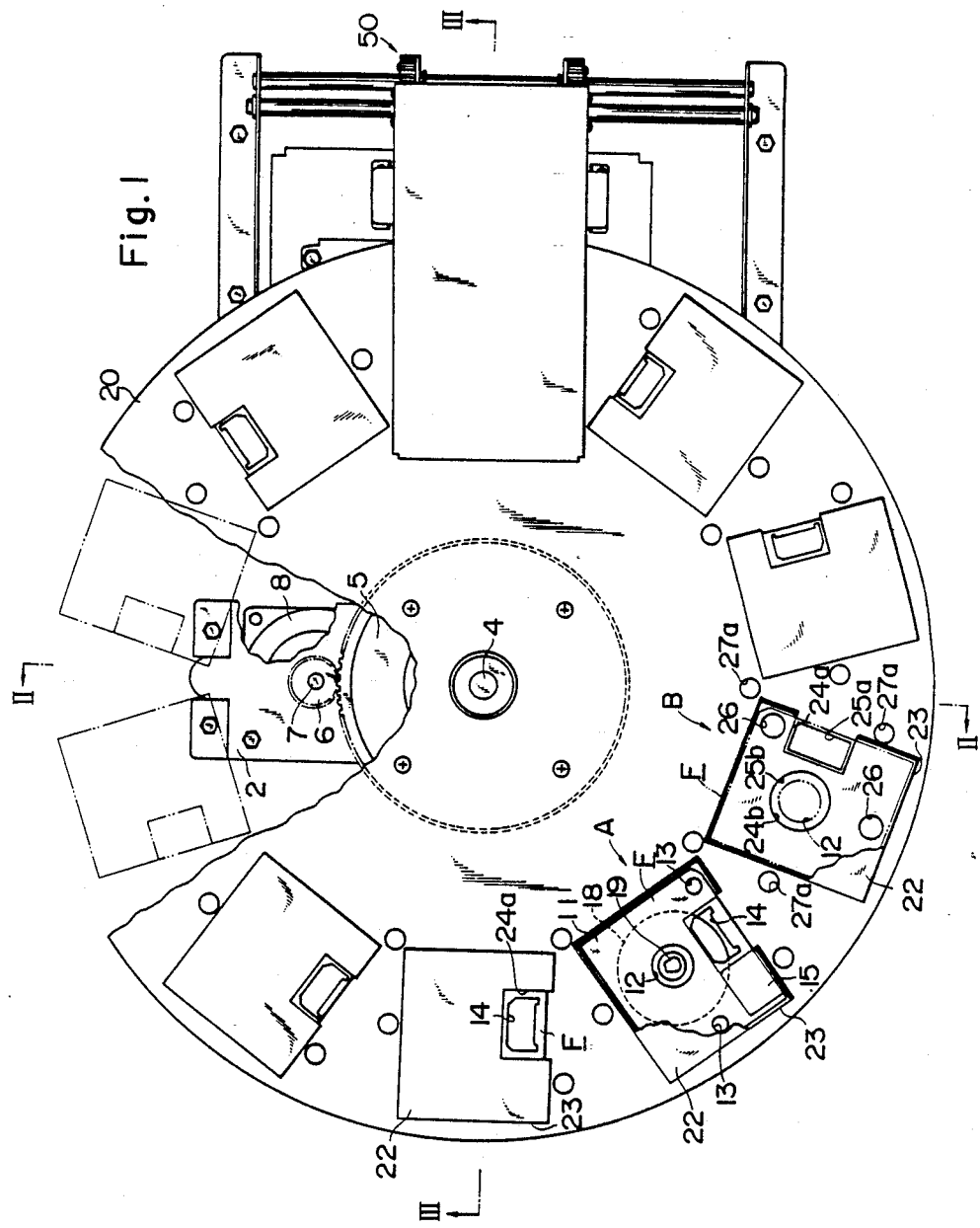
Figure 2:
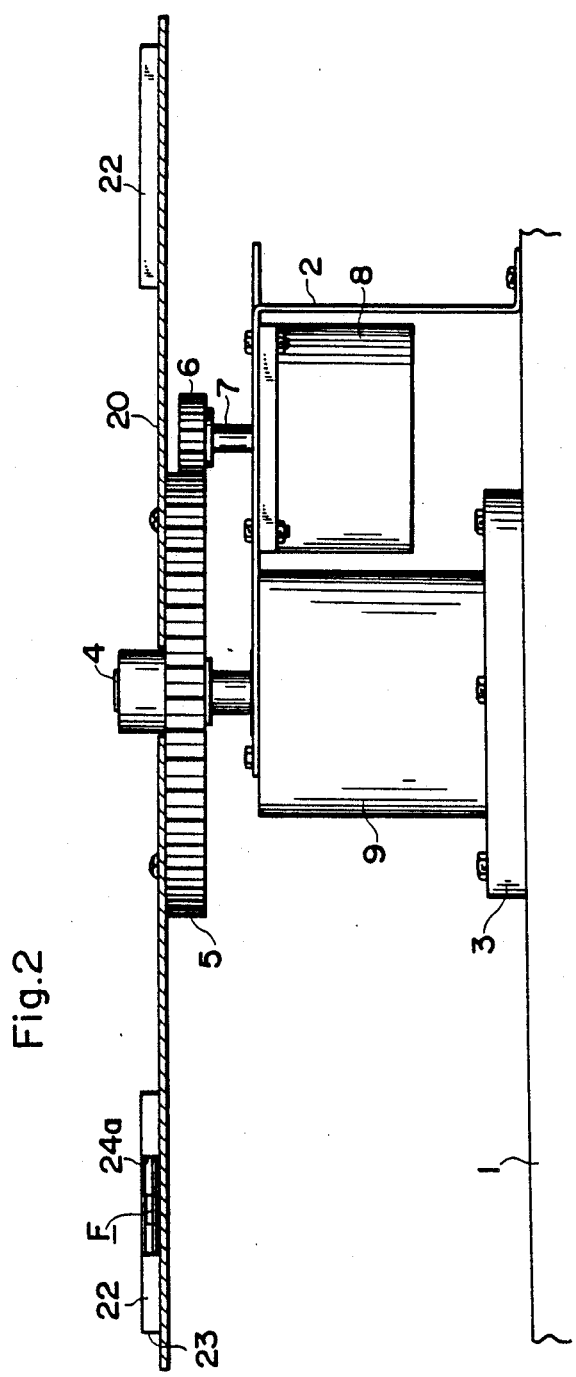
Figure 3:
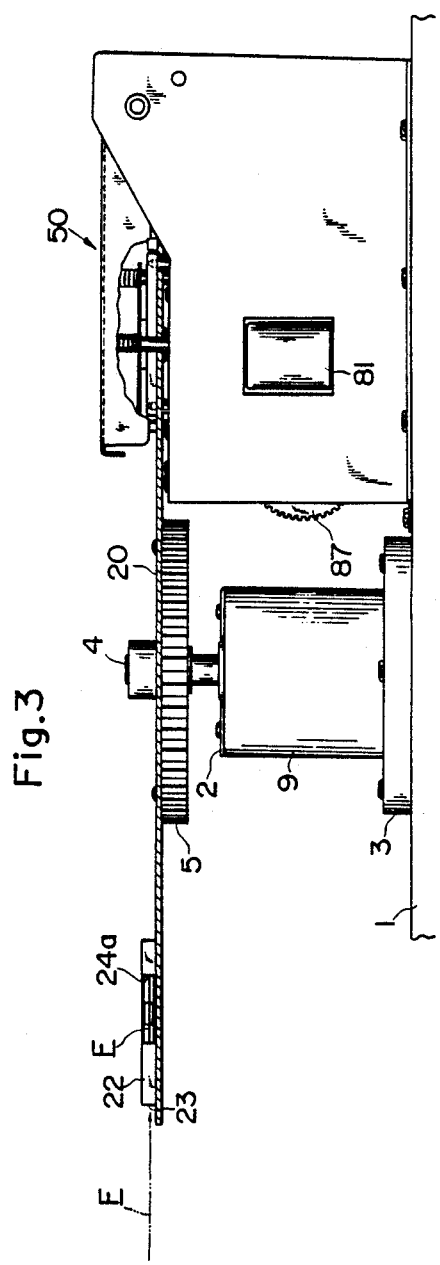

FIGS. 1 through 3 illustrate the overall mechanical arrangement of a magnetic recording/playback apparatus, in which FIG. 1 is a plan view, FIG. 2 an enlarged sectional view taken along line II—II of FIG. 1, and FIG. 3 a sectional view taken along line III—III of FIG. 1. In FIG. 1, a bucket 22 indicated at arrow A is illustrated with an upper plate thereof cut away in order to show a video floppy F accommodated within the bucket. A bucket 22 indicated at arrow B is illustrated with the upper plate thereof cut away and with the video floppy F removed in order to show the construction of a lower plate thereof.

The video floppy F (a magnetic recording medium) loaded into the magnetic recording/playback apparatus comprises a magnetic disk 18 accommodated in a jacket 11 in a freely rotatable state. A disc hub (core) 19 located at the central portion of the disk 18 faces a hole 12 at the center of the jacket 11. A portion of both surfaces of the jacket 11 is provided with a window 14 which exposes a recording/playback area of the magnetic disk 18 to the outside of the jacket 11. Though the window 14 usually is closed by a shutter 15, the shutter is automatically opened by an open/close mechanism (not shown), which is provided inside the jacket 22, when the floppy is inserted into the bucket 22, described below. The jacket 11 is provided at a number of locations with holes 13 in which a positioning pin 74, described below, is inserted in order to position and fix the video floppy F inside the jacket 11.

A supporting disk 20 for holding the video floppy F is secured to a gear 5 provided on a rotary shaft 4. The latter is freely rotatably supported by a bearing stand 9 disposed on a pedestal 3. The pedestal 3 is secured to a floor plate 1.

The disk 20 is rotated by a pulse motor (stepping motor) 8. The latter is attached to a mounting member 2 secured to the bearing stand 9 and floor plate 1. The pulse motor 8 has an output shaft 7 provided with a gear 6 meshing with the gear 5. Thus, the driving force of the pulse motor 8 is transmitted to the supporting disk 20. Though the pulse motor 8 is characterized in that it can accurately decide the angle of the supporting rotation of disk 20, it goes without saying that an ordinary motor can be used if used in combination with a limit switch for positioning.

A plurality (ten in the illustrated embodiment) of the buckets 22 each accommodating a respective video floppy F are fixedly provided on the disk 20. The buckets 22 are arranged along the circumference of the disk 20 and are spaced apart equiangularly. The end face of each bucket 22 on the outer side thereof is fully open (the position of the opening being indicated at numeral 23) in order for the video floppy F to be inserted.

The bucket 22 has an upper plate and a lower plate each of which is formed to include a cut-out 24a. The positions of the cut-outs 24a coincide with the position of the window 14 of the floppy disk F loaded in the bucket 22. The disk 20 also has a window 25a at a position corresponding to the cut-outs 24a. When the bucket 22 arrives at a recording/playback section 50, described below, and a recording/playback operation starts, a retaining plate 63 is advanced from above through the cut-out 24a and window 14 and contacts the magnetic disk 18. A magnetic head is advanced from below through the window 25a, cut-out 24a and window 14 to contact the surface on the opposite side of the magnetic disk 18, namely the recording/playback surface.

The lower plate of the bucket 22 is provided with a hole 24b into which a spindle 76a, described below, may advance, and holes 26 through which positioning pins 74 pass. The disk 20 is also provided with holes corresponding to the holes 24b, 26. (The hole corresponding to the spindle hole 24b is designated 25b.)

The disk 20 is also provided with holes 27a, through which position retaining pins 75 pass for positioning a holder 64, described below, at positions on both sides of the bucket 22.

The recording/playback section 50 is located at a predetermined angular position of the disk 20. Another predetermined angular position, for example a position on the side opposite the recording/playback section 50, is a position at which the video floppies F are loaded and unloaded. A video floppy F is inserted, through the opening 23, into a bucket 22 which has been brought to the loading/unloading position by rotation of the disk 20. After being inserted, the video floppy F is locked by a locking mechanism (not shown) provided inside the bucket 22. The opening 23 is closed when the floppy is in the locked state. The bucket 22 may be pivotally supported at one edge thereof and adapted so as to assume an upwardly inclined attitude with the opening 23 thereof facing upward.

The recording/playback section 50 will now be described with reference to FIGS. 4 through 6.

Figure 4:
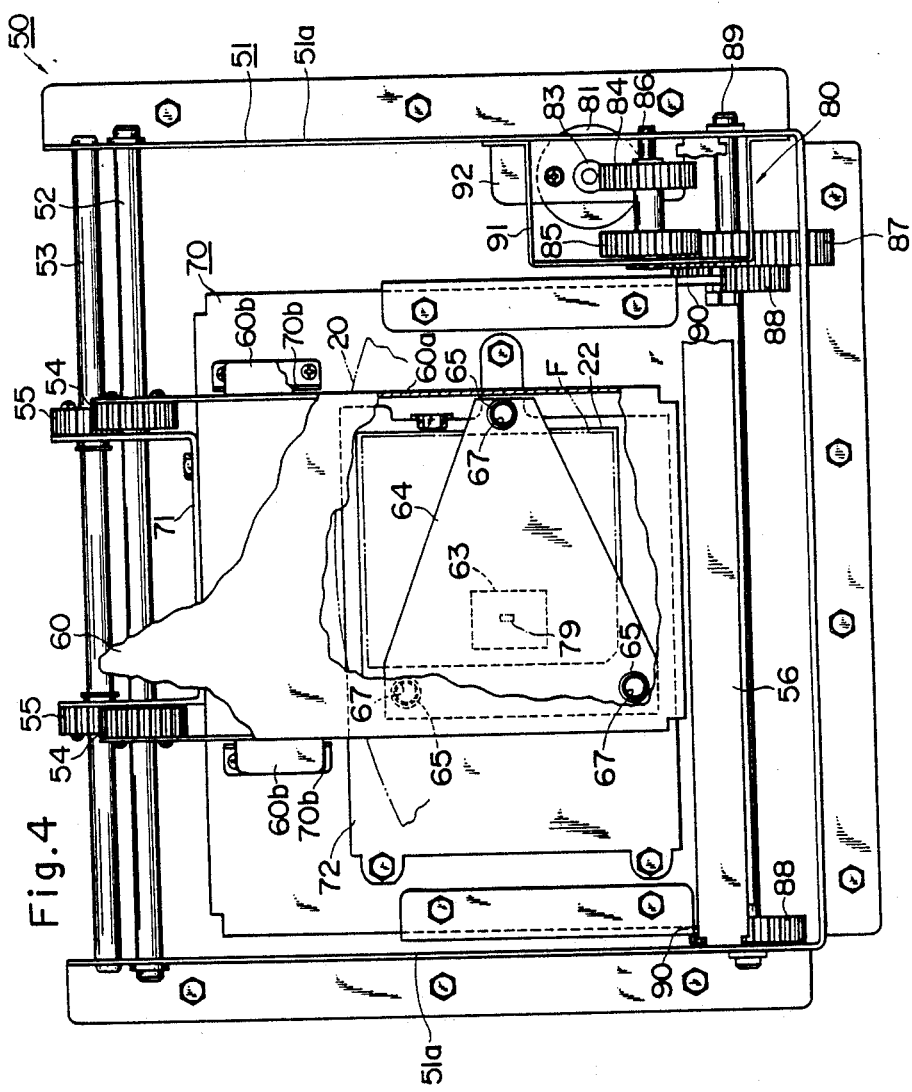

FIG. 4 is an enlarged plan view of the recording/playback section 50, with a portion shown cut away.

Figure 5:
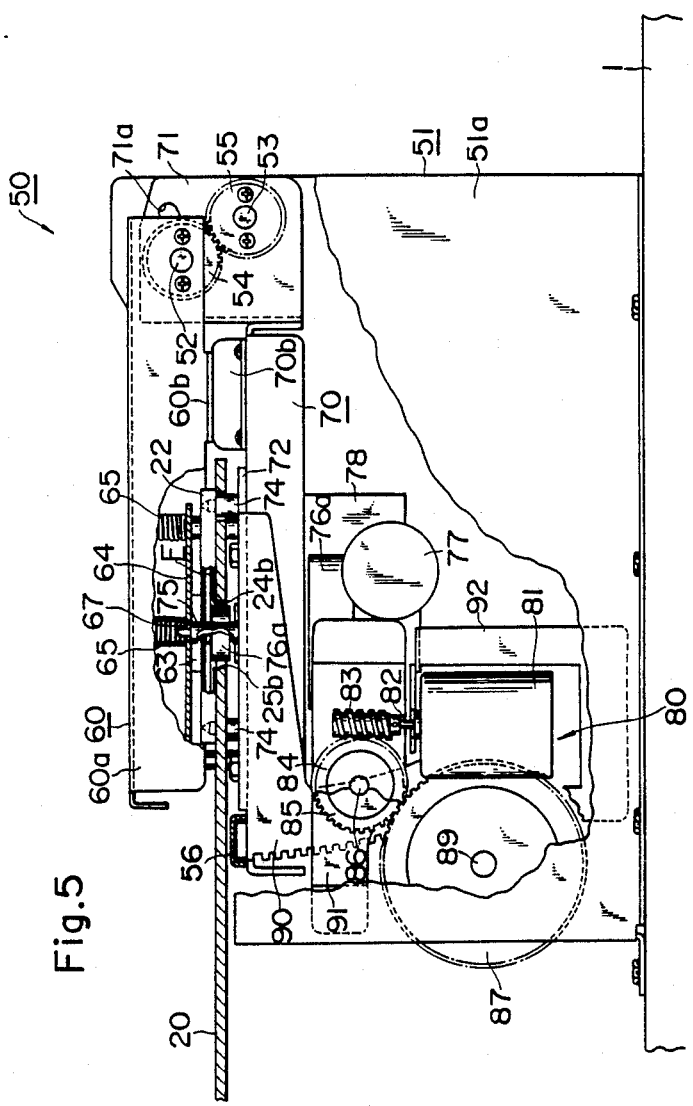
Figure 6:
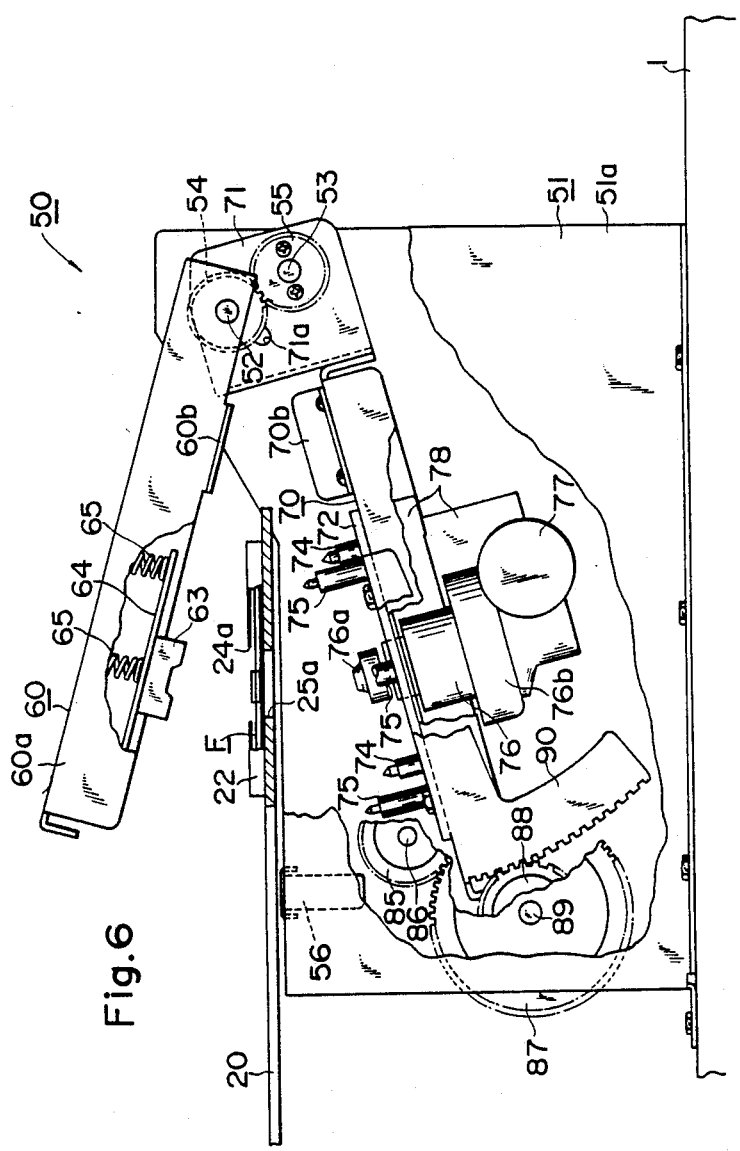

FIGS. 5 and 6 are right-side views of FIG. 4 showing a portion of a side plate cut away. FIG. 5 illustrates a recording/playback operating state and FIG. 6 shows a state in which drive units are open. A drive mechanism 80 is deleted from FIG. 6. When the front, rear, left and right sides of the apparatus are referred to hereinafter, FIG. 4 will serve as the reference.

The recording/playback section 50 has a front surface as well as left and right side surfaces surrounded by a frame 51 secured to the floor plate 1. Shafts 52, 53 which are parallel to each other are freely rotatably connected between the rear portions of left and right side plates 51a constituting the frame 51. Two gears 54 spaced apart a fixed distance are secured to the shaft 52, and two gears 55 spaced apart a fixed distance are secured to the shaft 53. The gears 54 are in mesh with corresponding ones of the gears 55. A crosspiece 56, both sides of which are bent downwardly, spans the front portions of the two side plates 51a of frame 51. The crosspiece 56 reinforces the frame 51 and stops the swinging motion of a support plate 70, described below, at the position thereof.

Both sides of a support plate 60 holding an upper drive unit are bent downwardly to form side plates 60a. The side plates 60a extend rearwardly to form arms which are fixed to the outer side surfaces of the aforementioned gears 54. The drive unit held by the support plate 60 is a retaining plate mechanism and has a retaining plate 63 and a holder 64. The retaining plate 63 is secured to the holder 64, and the holder 64 is held on the support plate 60 by coil springs 65. Holes 67 through which the position retaining pins 75 are passed are provided at the positions where springs 65 are mounted. Stopper pieces 60b extend horizontally from the left and right side plates 60a of the support plate 60.

The support plate 70 holds a lower drive unit and is fixed to the gears 55 by a mounting member 71. The member 71 has an arm portion provided with an oblong hole 71a through which the shaft 52 is passed. Though the mounting member 71 is swung in a manner described later, the mounting member 71 and the shaft 52 do not interfere with each other by virtue of the oblong hole 71a.

The center of the support plate 70 is provided with a large opening and a stationary member 72 is fixed to the support plate so as to be situated at the opening. A rotatative drive unit for rotatively driving the magnetic disk 18 and a head transfer unit for transferring a magnetic head diametrically with respect to the magnetic disk 18 are provided on the stationary member 72. The rotative drive unit includes a motor 76 having a spindle 76a, a frequency generator 76b for generating a signal the frequency of which represents the rotational speed (rpm) of the motor 76, and a circuit board on which the control circuit of the motor 76 is assembled. The head transfer unit includes a stepping motor 77, a mechanism which holds the magnetic head 79 in such a manner that the head is free to move, and a mechanism for converting the rotation of the stepping motor 77 into linear motion of the magnetic head 79. These mechanisms and the circuit board are housed in a box 78. The spindle 76a of motor 76 and the magnetic head 79 (which is indicated by the phantom line in FIG. 4 but hidden by the spindle 76a in FIG. 6) project from the upper side of the stationary member 72. The position retaining pins 75 and the positioning pins 74 are erected on the stationary member 72 at appropriate locations. The position retaining pin 75, which is for regulating the height position and the horizontal position of the retaining plate 63 and the holder 64 thereof, is comparatively long, and the positioning pin 74 decides the position of the video floppy F. The upper portion of each of the pins 74, 75 is slender and reduced in diameter to form a stepped portion for regulating the height position.

A sector gear 90 is formed on the front portion of each of the left and right sides of the support plate 70. Stopper pieces 70b are provided on the support plate 70 at positions opposing the stopper pieces 60b of the upper support plate 60. At the time of a recording/playback operation, the stopper pieces 60b of the support plate 60 and the stopper pieces 70b of the support plate 70 come into abutting contact to prevent swinging motion of both support plates 60, 70.

The upper support plate 60 and lower support plate 70 are situated at positions above and below the disk 20, respectively. A drive mechanism 80 for swinging the support plates 60, 70 to move the aforementioned drive units provided on respective ones of these support plates toward and away from each other will now be described.

A shaft 89 is freely rotatably connected between the front portions of the left and right side plates 51a of frame 51. Gears 88 are secured to the shaft 89 at positions corresponding to the respective sector gears 90 and are in mesh with these sector gears. A large-diameter gear 87 is fixedly secured to one of these two gears 88.

A drive motor 81 is secured to the frame 51 by means of a mounting member 92. The motor 81 has an output shaft 82 to which a worm 83 is secured. A worm gear 84 meshing with the worm 83 is secured to a shaft 86 along with a gear 85 and is spaced a predetermined distance away from the gear 85. The shaft 86 is freely rotatably supported between the frame 51 and a mounting member 91 provided above the motor 81. The gear 85 is in mesh with the gear 87.

When the motor 81 is driven starting from the state shown in FIG. 6 (the output shaft 82 rotating clockwise in FIG. 4), the worm gear 84 rotates via the worm 83 and the gear 85 coaxial therewith also rotates. The rotation of gear 85 is transmitted to the gears 88 through the gear 87 secured to the shaft 89. Since the gear 88 transmits a rotating force to the sector gear 90 meshing therewith, the lower support plate 70 swings about the shaft 53 in a direction which points the front portion of the support plate upwardly. Since the rotation of shaft 53 is transmitted to the shaft 52 via the gears 55, 54, the upper support plate 60 is swung about the shaft 52 in a direction opposite that of the support plate 70, namely in a direction that points the front portion of the support plate downwardly. Accordingly, the support plates 60, 70 are moved toward each other so that the drive units attached to these support plates approach each other.

A portion of the supporting disk 20 is located between the support plates 60, 70 and a predetermined bucket 22 on the supporting disk 20 is positioned at the recording/playback position. The lower support plate 70 approaches the supporting disk 20 from therebelow, and the pin 74 enters the hole 13 in the selected video floppy F (stored in the predetermined bucket 22) upon passing through the hole in the disk 20 and the hole 26 in the lower side of the bucket 22, thereby positioning the video floppy F. The spindle 76a fits into the core 19 of the magnetic disk 18 in the video floppy F upon passing through the hole 25b in the supporting disk 20, the hole 24b in the lower plate of bucket 22 and the hole 12 in the video floppy F. As a result, the magnetic disk 18 is chucked on the spindle 76a. The magnetic head 79 contacts the magnetic disk 18 through the opening 25a of the disk 20, the opening 24a of bucket 32 and the window 14 of jacket 11. Meanwhile, the upper support plate 60 approaches the disk 20 from above. The pin 75 passes through the hole 27a of the disk 20, projects from above the disk 20 and enters the hole 67 in holder 64. Since the stepped portion of pin 75 abuts against the rim of the hole 67 in holder 64, the height of the holder 64 and, hence, the height of the retaining plate 63, are regulated by the stepped portion. The retaining plate 63 passes through the opening 24a of bucket 22 and the window 14 of jacket 11 to contact the magnetic disk 18 from above at a position opposing the magnetic head 79. As a result, excellent contact is maintained between the magnetic head 79 and the magnetic disk 18. Thus, the state shown in FIG. 5 is established to make possible a recording/playback operation.

The manner in which video floppies F are changed in the magnetic recording/playback apparatus of the invention will now be described. When the drive motor 81 is rotatively driven in a direction opposite to that mentioned above after a predetermined video floppy F is subjected to a recording/playback operation, the upper and lower support plates 60, 70 and the drive units provided thereon are separated from each other to attain the state shown in FIG. 6. Thereafter, the supporting disk 20 is rotated through a predetermined angle to bring the next video floppy F to the recording/playback position. When this occurs, the motor 81 is driven into operation again to move the upper and lower support plates 60, 70 toward each other. As a result, the state shown in FIG. 5 is established. In this state, the video floppy F brought to the recording/playback position is subjected to a recording/playback operation.

Figure 7:
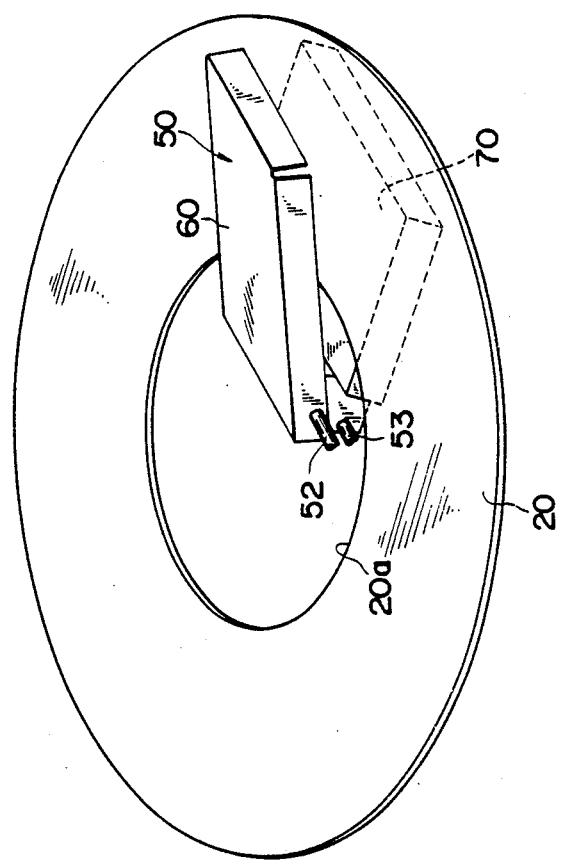
FIG. 7 is a perspective view illustrating the general features of a modification of the invention.

In the foregoing embodiment, the support plates 60, 70 having the drive units of the recording/playback section 50 are secured to the respective shafts 52, 53 provided outwardly of the circumference of the disk 20. As shown in FIG. 7, an opening 20a may be provided at the central portion of the disk 20, and the recording/playback section 50 may be disposed within the opening 20a. In this case, the support plates 60, 70 are swung about the shafts 52, 53 disposed inwardly of the inner circumference of the disk 20. An arrangement may be adopted in which the disk 20 is freely rotatably supported by upper and lower drive rollers and a circular guide (which would include rollers, depending upon the particular case).

Further, an arrangement may be adopted in which the upper and lower support plates having the respective drive units are held so as to be capable of approaching and separating from each other while remaining in parallel, whereby these support plates may approach and separate from the disk 20 from the upper and lower sides thereof.

FIGS. 8 through 12 illustrate another embodiment of the invention, in which portions identical with those of the first embodiment are designated by like reference characters and need not be described again.

Figure 8:
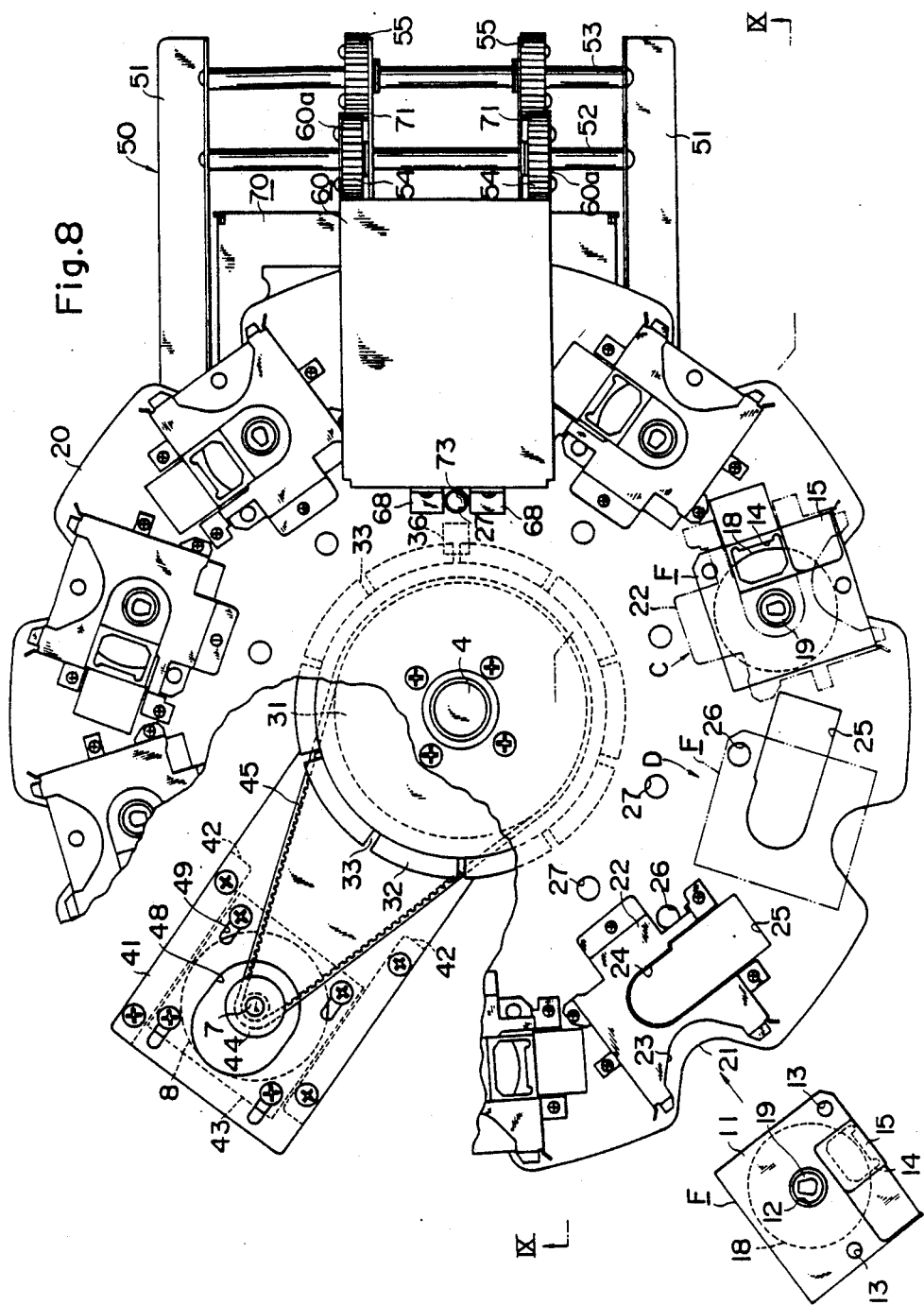
Figure 9:
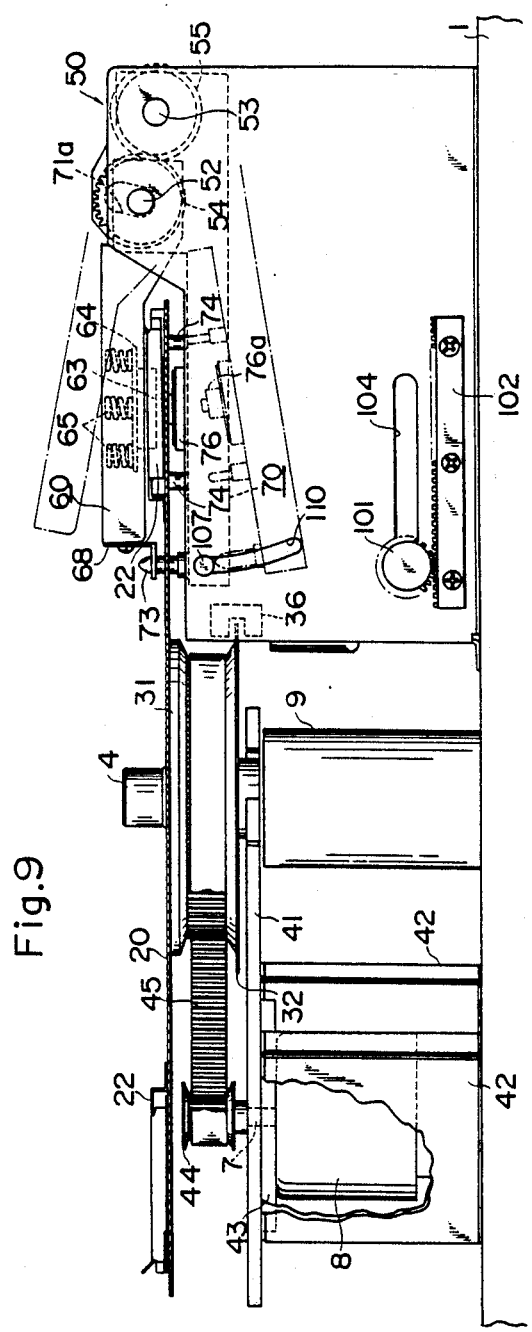

FIGS. 8 and 9 illustrate the overall mechanical arrangement of an auto-changer in a magnetic recording/playback apparatus, in which FIG. 8 is a plan view and FIG. 9 a sectional view taken along line IX—IX of FIG. 8. In FIG. 8, a bucket 22 at arrow C is indicated by a chain line in order to show a video floppy F accommodated therein. The bucket has been removed from the location at arrow D in order to show the construction of the disk 20 at this location. Here only the video floppy F is indicated by the phantom line. It should be noted that the construction of the video floppy F is the same as that of the video floppy in the first embodiment.

The disk 20 for holding the floppies F is secured to a belt wheel 31 fixed to the rotary shaft 4. The stepping motor 8 for rotating the disk 20 is disposed at a position spaced a short distance away from the shaft 4. Preferably, the position at which the stepping motor 8 is secured is within the outer circumference of the disk 20 in order to use the space below the disk 20 effectively.

A transverse member 41 bridges and is secured to a support member 42 fixed to the floor plate 1 and the aforementioned bearing stand 9. The stepping motor 8 is mounted on the transverse member 41 by screws through the intermediary of a mounting member 43. The transverse member 41 is formed to have a plurality of oblong holes 49 through which the aforementioned screws are passed, and a large oblong hole 48 from the upper side of which the output shaft 7 of the stepping motor 8 projects. The oblong holes 49 make it possible to adjust the mounting position of the stepping motor 8.

A belt wheel 44 formed to have teeth is secured to the output shaft 7 of stepping motor 8. Teeth are also formed on the belt wheel 31 to which the disk 20 is secured. A timing belt 45 is stretched between the belt wheels 44, 31 so that the disk 20 may be rotated by the stepping motor 8. Since the timing belt 45 is thus used as means for transmitting the rotating force of the stepping motor 8 to the disk 20, the timing belt 45 acts as a shock absorber so that noise and vibration can be suppressed. The stepping motor 8 itself has a high positioning precision and the occurrence of vibration is suppressed. As a result, the stepping motor 8 does not readily become maladjusted. This makes it possible to maintain the high positioning precision of the disk 20.

The peripheral portion of the belt wheel 31 on the lower side thereof extends radially outwardly to form a flange portion 32. The flange portion 32 is formed to have radial slits 33 at angular positions where the buckets 22 are provided. The slits 33 are detected by a photoelectric switch 36, described below, provided in the recording/playback section 50. The disk 20 may thus be positioned accurately at the aforementioned angular positions. More specifically, a predetermined one of the buckets 22 on disk 20 may be correctly positioned at the location of the recording/playback section 50.

The plurality of buckets 22 accommodating respective video floppies F are secured to the disk 20 by screws. The end face on the outer side of each bucket 22 is fully open and is cut into an arcuate shape in order that the video floppy F may be inserted therein. Numeral 23 indicates both the position of the opening and the cut-out portion. A portion of the upper side of bucket 22 is cut away to form an opening 24. The window 14 and center hole 12 of the video floppy F loaded in the bucket are exposed by the opening 24.

The disk 20 also has an opening 25 at a position corresponding to the opening 24 of bucket 22. The opening 25 is longer than the opening 24 of bucket 22. When the bucket 22 arrives at the recording/playback section 50 and a recording/playback operation starts, the retaining plate 63 is advanced from above through the opening 24 and window 14 and contacts the upper surface of the magnetic disk 18. The magnetic head 79 is advanced from below through the opening 25 and window 14 to contact the lower surface of the magnetic disc 18, namely the recording/playback surface. The spindle 76a of motor 76, which rotates the magnetic disc 18, also advances through the opening 25.

The circumferential edge portion of the disk 20 is formed to have arcuate cut-outs 21, which correspond to the arcuate cut-outs 23 of buckets 22 and are similar thereto, at positions where the buckets 22 are provided. These cut-outs 21, 23 are for facilitating the insertion and removal of the video floppies F with respect to the buckets 22 at a floppy loading/unloading position. This can be any position, such as the position illustrated in FIG. 8 where a floppy F is shown at the side of the corresponding bucket 22, or a position having point symmetry with respect to the recording/playback section 50 and rotary shaft 4. Since a portion of the floppy F loaded in the bucket 22 is exposed to the outside by the cut-outs 21, 23, the floppy F can be inserted or removed by hand or by a loading/unloading mechanism. One bucket 22 can be provided with one each of the cut-outs 21, 23 or with a plurality of each.

The disk 20 is provided with a hole 26 through which the positioning pin 74 passes, and a hole 27 through which a positioning pin 73 passes.

The bucket 22 may be provided with a mechanism for locking the floppy F, which has been inserted into the bucket 22, at the loading/unloading position, and with a mechanism for opening and closing the shutter 15 at loading/unloading of the video floppy F with respect to the bucket 22.

The recording/playback section 50 will now be described with reference to FIGS. 10 and 11.

Figure 10:
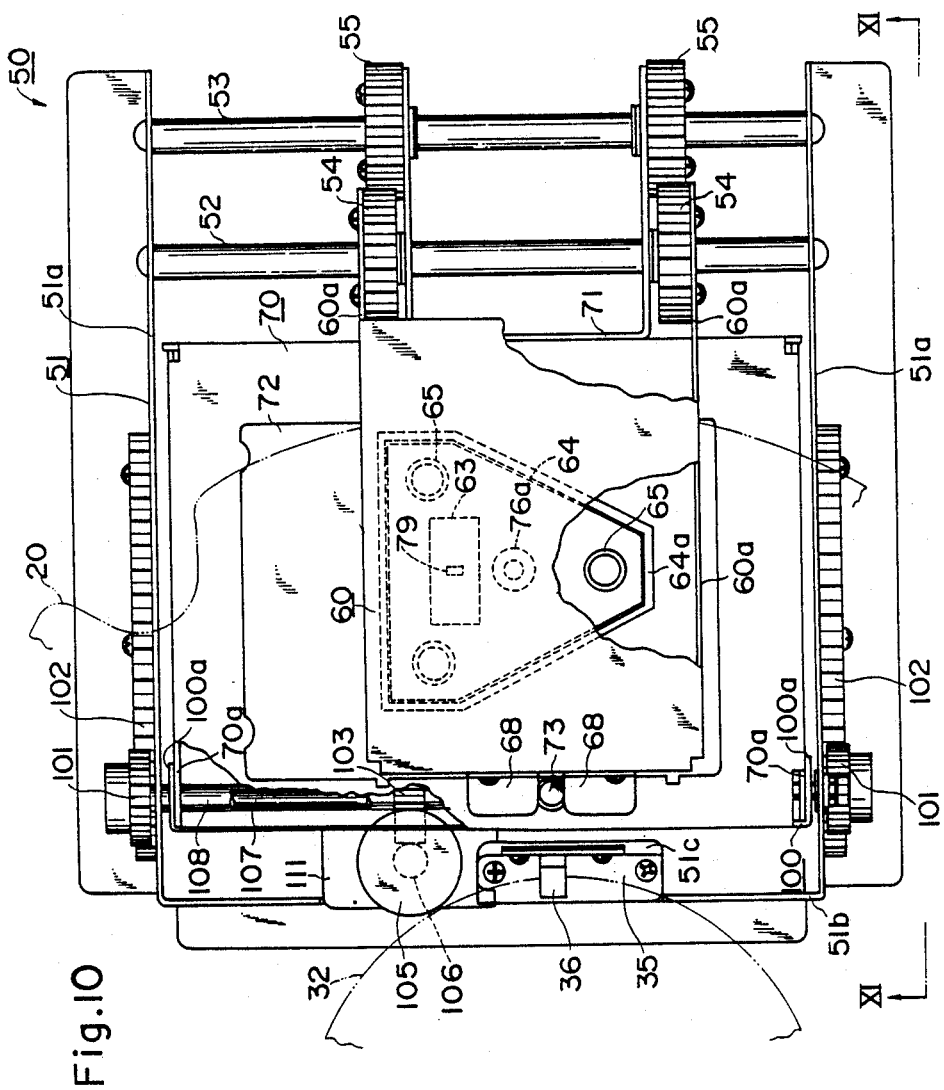

FIG. 10 is an enlarged plan view of the recording/playback section 50, with a portion of section 50 being shown cut away. FIG. 11 is a view as seen from line XI—XI in FIG. 10, a portion of a side plate being shown cut away. FIGS. 11 illustrates a recording/playback operating state. This embodiment is similar to that described earlier in that the upper and lower support plates are supported so as to be swung freely by the gears 54, 55, respectively, so as to approach and separate from each other simultaneously, the upper support plate 60 is provided with the retaining plate mechanism that includes the retaining plate 63; and the lower support plate 70 is provided with the rotational drive unit, which includes the spindle and motor 76, for rotatively driving the magnetic disk 18, and the magnetic head transfer mechanism for transferring the magnetic head 79.

A guide 64a for preventing sideways displacement of the holder 64 is secured to the support plate 60 along the outer edge of the holder 64. The distal end portion of the support plate 60 (namely the portion on the left side in FIGS. 10 and 11) is bent downwardly and has a pair of left and right positioning members 68 attached thereto. The two positioning members 68 have respective horizontal portions and are secured to the support plate 60 leaving a space between them large enough for the positioning pin 73 (described below) on the side of the support plate 70 to fit therebetween. The positioning members 68 are not absolutely essential.

The positioning pin 73 is erected on the distal edge portion of the lower positioning plate 70. By being passed through the hole 27 in disk 20, the positioning pin 73 brings the angular position of the disk 20 into accurate agreement with the position of the support plate 70 after the disk 20 is rotated by the stepping motor 8, and it also regulates the positional relationship between the upper support plate 60 and lower support plate 70 when these two support plates are made to approach each other.

The stoppers 60b, 70b, positioning pin 75 and the like are not provided.

This embodiment differs from the first embodiment in terms of the drive mechanism that drives the upper and lower support plates 60, 70. The drive mechanism will now be described.

A shaft 107 bridges and is secured to side plates 70a of the support plate 70. A link member 100 has a width slightly larger than that of the support plate 70 and both sides of the link member 100 are bent, with the bent portions being denoted by numeral 100a. The shaft 107 is passed through these bent side portions 100a so as to be free to rotate. The two end portions of shaft 107 extend outwardly of the two side plates 51a of frame 51, these ends projecting to the outside of the side plates 51a upon being passed through curved, oblong holes 110 formed therein (see FIG. 9). The range over which shaft 107 moves is decided by the length of the oblong holes 110.

A shaft 108 is freely rotatably fitted between the lower ends of both side portions 100a of link member 100. Like the shaft 107, both ends of the shaft 108 project outwardly from the side plates 51a through oblong holes 104 provided in the side plates 51a at the lower portion thereof so as to extend horizontally (see FIG. 9). The range of movement of shaft 108 is decided by the oblong holes 104. Pinions 101 are secured to the respective ends of the shaft 108 projecting outwardly from the side plates 51a of frame 51. Horizontally extending racks 102 are secured to the two side plates 51a at the lower portion thereof along the oblong holes 104. The pinions 101 are in mesh with respective ones of the racks 102.

A gear 103 is secured to the shaft 108 near the central portion thereof and is in mesh with a worm 106 secured to the output shaft 105a of a motor 105. The motor 105 is secured to a mounting piece 111 fixed to and protruding from the front part of link member 100. The distal end of output shaft 105a of motor 105 is freely rotatably supported by a hole provided in a mounting piece 112 projecting downwardly from the link member 100.

An opening which allows the motor 105 to be avoided is provided in the front plate 51b of frame 51 in the recording/playback section 50. A portion of the front plate 51b is bent horizontally to form a mounting piece 51c. The abovementioned photoelectric switch 36 is secured to the mounting piece 51c via the mounting member 35. Rotation of the stepping motor 8 is controlled based on a detection signal from the photoelectric switch 36 so that a predetermined bucket 22 and the video floppy F accommodated therein will be positioned at the recording/playback section 50.

Figure 11:
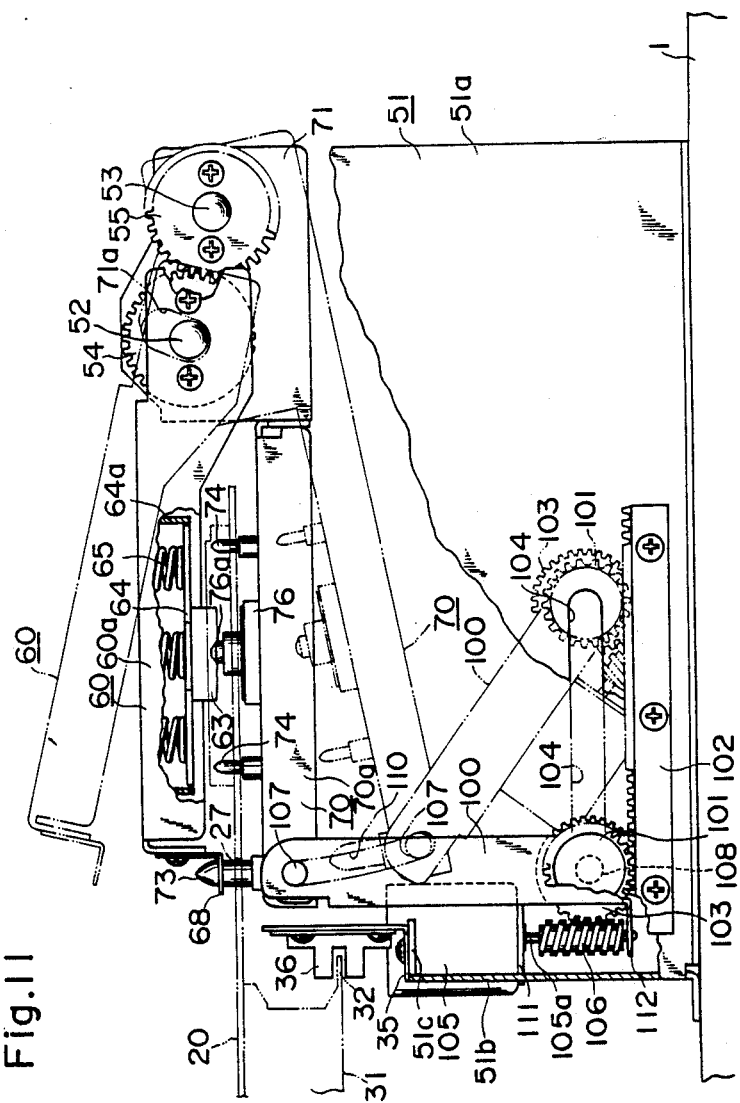

When the recording/playback section 50 is executing recording or playback processing, the support plates 60, 70 are in the closed state, as indicated by the solid lines in FIG. 11. At this time the link member 100 is substantially vertical and the shaft 108 is situated at one end of the oblong hole 104.

When a video floppy F is to be changed, the motor 105 is driven into operation to rotate the gear 103 clockwise in FIG. 11 via the worm 106. As a result, the pinion 101 moves to the other end of the oblong hole 104 while meshing with the rack 102. As this is taking place, the link member 100 tilts, as indicated by the phantom lines in FIG. 11, so that the support plate 70 descends about shaft 53 to the position indicated by the phantom lines. The shaft 107 passing through the support plate 70 moves to the lower end of the oblong hole 110. As the support plate 70 swings, the gear 55 of shaft 53 rotates counter-clockwise. Since the gear 54 is meshing with the gear 55, the gear 54 rotates clockwise, thereby swinging the support plate 60 upward to the position indicated by the phantom lines in FIG. 11. Thus, the two support plates 60, 70 open, i.e. move away from each other.

In this state the recording/playback section 50 executes a video floppy exchange. More specifically, the disk 20 is rotated by the motor 8 until a predetermined (e.g. the next) video floppy F arrives at the predetermined position of the recording/playback section 50 (i.e. until a predetermined slit 33 is detected by the photoelectric switch 36). When the disk 20 stops at the predetermined angular position, the motor 105 is rotated in a direction opposite to that mentioned above so that the link member 100 again swings the support plate 70 upwardly. The support plates 60, 70 approach each other from the top and bottom sides of the disk 20. The spindle 76a provided on the support plate 70 chucks the magnetic disc 18 of the floppy disc F upon advancing through the opening 25 of disk 20. The magnetic head 79 gently contacts the magnetic disc 18 inside the floppy disc F. The positioning pin 74 erected on the support plate 70 enters the hole 13 of the floppy disc F in bucket 22 upon passing through the hole 26 in disk 20, thereby positioning the floppy disc F. The positioning pin 73 of support plate 70 passes through the hole 27 in disk 20 and projects from the top side of the disk 20, thereby angularly positioning the same more accurately. (At this time the stepping motor 8 is in a weakly energized or non-energized state.) The distal end of pin 73 is fitted into the positioning member 68 of the support plate 60, whereby the support plates 60, 70 are fixed to each other. The retaining plate 63 of support plate 60 passes through the opening 24 of bucket 22 and penetrates the interior of the floppy disc F through the window 14 thereof, thereby contacting the magnetic disc 18.

Figure 12:
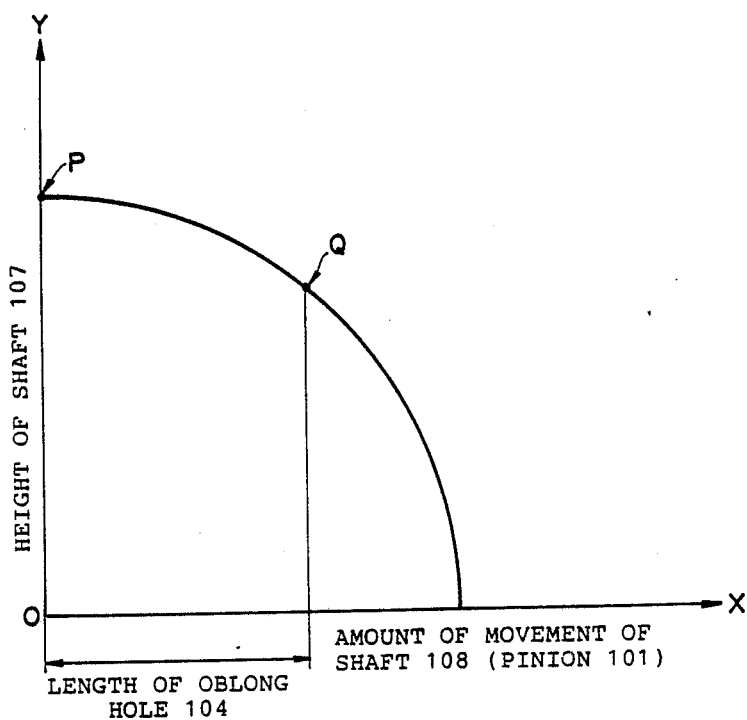

FIG. 12 illustrates the relationship between the movement of the lower end (shaft 108) of link member 100 and the height of the upper end (shaft 107) of link member 100.

The X axis represents the amount of horizontal movement of the lower end of link member 100, and the Y axis represents the height of shaft 107, with the position of the center line of oblong hole 104 serving as the origin. A point P indicates the position of the shaft 107 shown by the solid lines in FIG. 11, and a point Q indicates the position of the shaft 107 shown by the phantom lines in FIG. 11. It will be appreciated from the graph that the traveling speed of the upper end (shaft 107) of link member 100 changes even if the rotational speed of motor 105 is constant and the lower end (shaft 108) of link member 100 moves horizontally at a constant speed. Since the speed of the upper end of link member 100 slows down as the link member 100 assumes a vertical attitude, the speed at which the support plates 60, 70 draw near to each other gradually approaches zero. The speed of each support plate becomes zero when the support plates 60, 70 become horizontal and, moreover, the link member 100 becomes vertical.

Thus, even if the rotating speed of the motor 105 is raised, the support plates 60, 70 approach each other slowly and gently in a range where they are very close to each other. Hence, no shock is produced. In addition, the two support plates 60, 70 can be moved at a very high speed part of the way.

If some displacement should happen to occur in the position of the shaft 108 guided by the oblong hole 104 when the link member 100 assumes a nearly vertical attitude, the height of the shaft 107 will be almost unaffected. Therefore, control for positioning the shaft 108 does not require that much accuracy.

In accordance with the above-described embodiment, the driving force of the motor 8 is transmitted to the disk 20 by the timing belt 45, and the transmission of driving force from the motor 105 to the shaft 108 is performed by the worm 106 and worm gear 103. However, it goes without saying that the transmission of driving force can be performed by substituting other well-known means, such as a gear train, lead screw, wire, belt, etc.

In order to reduce the required driving force as much as possible, the point at which the support plate 70 and link member 100 are connected is provided at the distal end portion of the support plate 70 in the above-described embodiment. However, it goes without saying that the link member 100 can be connected to the support plate 70 at any point thereon.

A device for locking the magnetic recording medium and actuating the shutter thereof through a very simple arrangement will now be described with reference to FIGS. 13a through 16d.

The shutter actuating/locking device includes a spring provided at a position between mutually adjacent magnetic recording medium holding portions on a member on which there are arrayed a plurality of the magnetic recording medium holding portions each holding a magnetic recording medium having a shutter along one side thereof and a locking engagement recess formed on the other side thereof. Both ends of the spring extend toward respective ones of the mutually adjacent holding portions on either side thereof. One end of the spring serves as a shutter actuating portion for acting upon the shutter of the magnetic recording medium to open and close the same when it is loaded into an unloaded from the one holder portion on one side. The other end of the spring serves as a locking portion for engaging the engagement recess of the magnetic recording medium that has been loaded in the other holder on the other side of the spring.

Though this magnetic recording medium shutter actuating/locking device is used most preferably in the above-described auto-changer, use thereof is not necessarily limited to an auto-changer. Accordingly, the member on which the magnetic recording medium holder portions are arrayed is not limited solely to the aforementioned rotary body, and the plurality of holding portions can be provided on a moving body which reciprocates linearly or on a stationary base plate or the like. As will be described below, the magnetic recording medium holding portion is not limited solely to a bucket-shaped configuration but also includes guide-like means simply for guiding a magnetic recording medium when the medium is loaded and unloaded. The engagement recess in the magnetic recording medium is not limited to a recess formed in a side face of the case or jacket of the medium but also includes all configurations, such as an opening provided in a side wall, that are capable of being engaged by the other end of the aforementioned spring.

In accordance with this shutter actuating/locking device, the opening and closing of the shutter when the magnetic recording medium is loaded and unloaded, and the locking of the loaded magnetic recording medium can both be performed by one and the same spring. This makes it possible to reduce the number of component parts and simplify construction.

FIG. 13a is an enlarged view of a video floppy F (the magnetic recording medium) loaded in the magnetic recording/playback apparatus, and FIG. 13b is an enlarged view of a part of a shutter of the floppy F.

The video floppy F comprises the magnetic disc 18 freely rotatably accommodated in a circular partition 11a formed in the jacket 11. One side of the jacket 11 is formed to have a groove 11b. One side face of the shutter 15 for opening and closing the window 14 has a small opening 15b. A portion of this side face is folded into the groove 11b of jacket 11, thereby forming an engaging finger 15a.

A shutter locking member 16 for holding the shutter 15 in a closed position is provided inside the groove 11b of jacket 11 at one end thereof. The locking member 16 comprises a resilient body such as a synthetic resin and is fixed at one end thereof to the jacket 11. The locking member 16 extends substantially along one side of the jacket 11 and has an engagement recess 16a formed in its outer side surface. The distal end portion of the locking member 16 is formed so as to taper toward the inner side thereof. The locking member 16 is weakly biased toward the outer side thereof and has a portion 16b which engages a portion of the partition 11a, thereby being held at such a position that the locking member will not project outwardly of the side of jacket 11. When the window 14 is closed by the shutter 15, the finger 15a of shutter 15 fits into the engagement recess 16a of locking member 16, so that the shutter 15 is locked in the closed position.

The other side of the jacket 11 is formed to have an engagement recess 17 for locking the floppy F in the loaded position when the video floppy F is loaded in the bucket 22. It is permissible to provide the side wall of the jacket 11 with an opening used instead of the recess 17.

Figure 15:
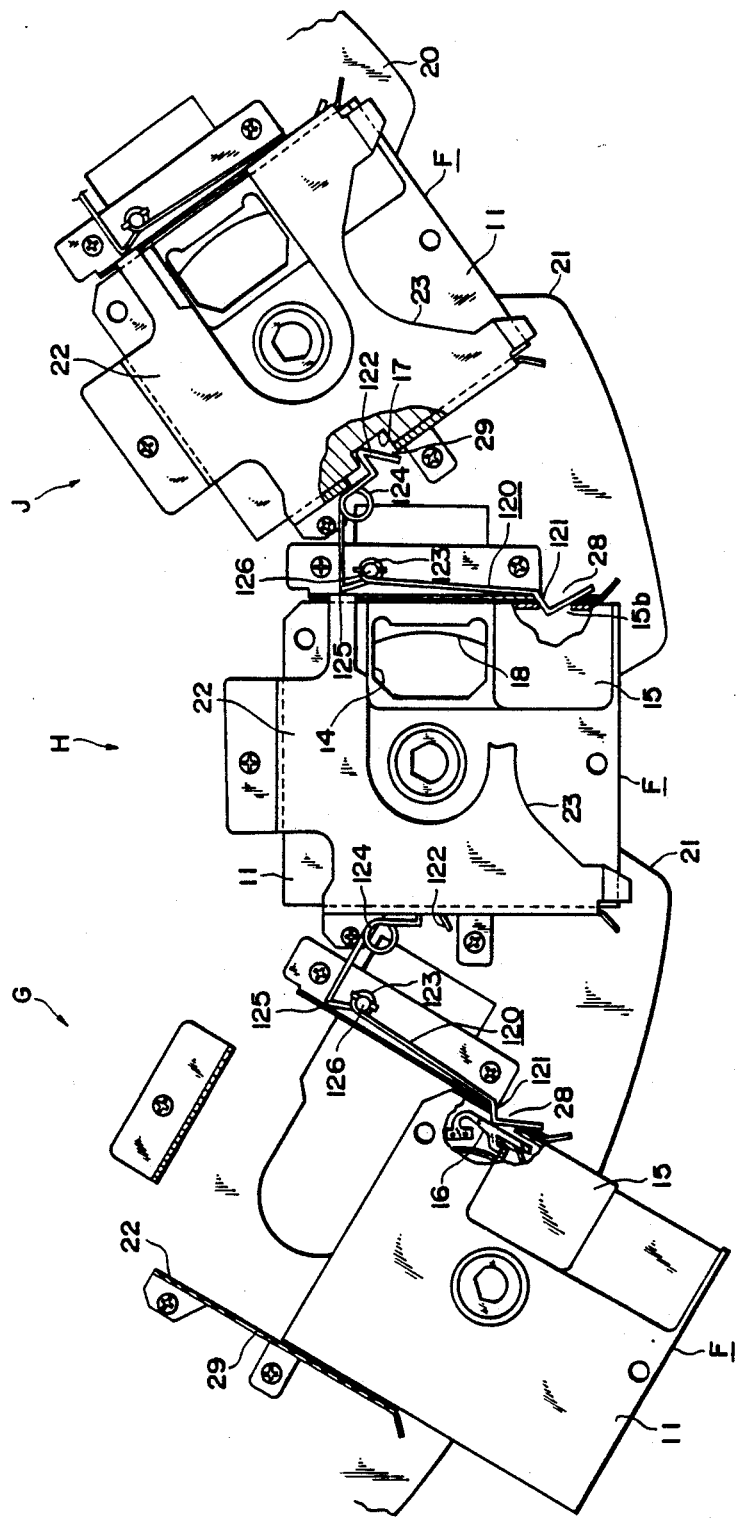

A spring 120 is provided between mutually adjacent buckets 22 on the disk 20. The spring 120 is for opening and closing the shutter 15 of the video floppy F loaded in and unloaded from the bucket 22, and for locking the video floppy F that has been loaded in the bucket 22. A developed view of the spring 120 is shown in enlarged form in FIG. 14. The location indicated by the arrow G in FIG. 15 illustrates the manner in which the video floppy F is inserted into the bucket 22. Here the top sheet of bucket 22 is deleted from the drawing in order to show the portion related to the opening and closing of the shutter 15 of video floppy F. Floppies F are shown loaded in the buckets 22 at the locations indicated by H and J.

Both sides of the buckets 22 are provided with openings 28, 29 through which a shutter actuating portion 121 and lock portion 122 of the spring 120 advance, respectively.

The spring 120 is generally scissor-shaped and both ends thereof are bent into a V-shaped configuration. The one end 121 serves as the abovementioned shutter actuating portion, and the other end is the abovementioned lock portion. The intermediate portion of the spring 120 is wound in coil-like fashion at two locations to form coil portions 123, 124. The spring 120 is bent at an acute angle between the coil portions 123, 124 to form a fulcrum portion 125. The spring 120 is attached at the coil portion 123 to a pin 126 erected on a mounting piece of the bucket 22. The fulcrum portion 125 of spring 120 is in abutting contact with the side face of bucket 22. By virtue of such an arrangement, both ends 121, 122 of the spring 120 are biased toward the buckets 22 on either side and fit into the openings 28, 29 of these buckets 22.

The spring 120 is made of a slender plate-shaped spring material or wire-shaped material. The coil portion 124 adjusts the load for locking the video floppy F and makes the height of the spring level with the engagement recess 17. However, the coil portion 124 is not absolutely necessary and it will suffice if the spring 120 is merely bent at the portion 124. In this embodiment, the buckets 22 are provided on the disk 20 in radiating fashion. However, if the buckets are arrayed in parallel with one another on a moving body that undergoes linear motion, the shape of the spring 120, particularly the opening angle between the end portions 121, 122, would be modified in dependence upon the positions of the buckets.

The operation performed by the spring 120 for opening and closing the shutter 15 of video floppy F and locking the video floppy will now be described with reference to FIG. 15 and FIGS. 16a through 16d. FIGS. 16a through 16d illustrate the manner in which the shutter 15 opens when the video floppy F is inserted into the bucket 22.

When the video floppy F is outside the bucket 22, the shutter 15 is closed and, as described above, the engaging finger 15a is inside the recess 16a of locking member 16 [FIG. 16a]. If the video floppy F is now inserted into the bucket 22 in such a manner that both its sides register with both sides of the bucket 22, the actuating portion 121 of the spring a portion of which is penetrating the interior of the bucket 22 through the opening 28 urges the locking member 16 inwardly so that the finger 15a and recess 16a disengage [FIG. 16b]. When the video floppy F is inserted further, the actuating portion 121 abuts against the end of the shutter 15. Accordingly, the shutter 15 is opened with the insertion of the video floppy F [FIG. 16c]. When the shutter 15 is opened fully to expose the window 14, the shutter 15 can move no farther (a portion of the shutter 15 abuts against a stopper such as a stepped portion formed on the jacket 11), so that the actuating portion 121 of spring 120 rides up on the side face of the shutter 15, slides therealong and eventually enters the opening 15b in the side face of shutter 15 [FIG. 16d]. In this state the video floppy F is fully accommodated inside the bucket 22.

As mentioned above, a part of the lock portion 122 of spring 120 penetrates the interior of the bucket 22 from the opening 29 on the other side of the bucket 22. When the video floppy F is inserted into the bucket 22, the lock portion 122 slides relative to the side face of the video floppy F. When the floppy is fully accommodated within the bucket 22, the lock portion 122 enters the engagement recess 17 of the floppy and locks the floppy in place. Accordingly, the video floppy F will not fly out of the bucket 22 even when the floppy is subjected to a centrifugal force by rotating the disk 20 at high speed.

When the video floppy F is pulled outwardly in order to extract it from the bucket 22, the lock portion 122 of spring 120 is released from the recess 17 by this pulling force. Furthermore, since the actuating portion 121 is engaged with the opening 15b of shutter 15, the shutter 15 is caused to close. When the floppy is pulled out even more, the shutter 15 is closed completely, after which the actuating portion 121 and opening 15b disengage. The actuating portion 121 rides up on the side face of the shutter 15 and subsequently presses against the lock member 16. When the video floppy F is completely extracted from the interior of the bucket 22, the lock portion 16 returns to its original position. As a result, the finger 15a of shutter 15 engages the recess 16b of the lock member 16, whereby the shutter 15 is locked in the closed position.

By thus merely providing a spring between mutually adjacent buckets, it is possible to simplify the arrangement for locking the video floppy inserted into the bucket and for opening and closing the shutter as the video floppy is loaded and unloaded. As a result, the number of component parts used can be greatly reduced.

As many apparently widely different embodiments of the present invention can be made without departing from the spirit and scope thereof, it is to be understood that the invention is not limited to the specific embodiments thereof except as defined in the appended claims.

What is claimed is:

1. A recording/playback apparatus comprising:
    a rotary body (20) on which a plurality of holding means each holding a disk-like recording medium (F) in a freely loadable and unloadable manner are fixedly arranged at predetermined angular intervals circumferentially about the rotary body, and
    two types of drive units provided at a predetermined angular position with respect to said rotary body and arranged to freely approach and separate from a selected one of said plurality of holding means which has arrived at said predetermined position for rotatively driving the selected recording medium held by said selected one of said plurality of holding means and subjecting the selected recording medium to recording/playback, one of said drive units approaching and separating from one main surface of said disk-like recording medium and the other of said drive units approaching and separating from the other main surface of said recording medium.

2. The apparatus according to claim 1, wherein each said recording medium has a magnetic recording portion (18), one of said drive units is equipped with a means for rotatively driving the magnetic recording portion of the selected recording medium, and a magnetic head for magnetic recording/playback, and the other of said drive units is equipped with a retaining means for maintaining the magnetic head in contact with the magnetic recording portion.

3. The apparatus according to claim 2, wherein said retaining means comprises a retaining plate.

4. A device for engaging and disengaging drive units with a magnetic recording medium which is in a predetermined position in a recording/playback apparatus, which device comprises:
    a frame;
    a first support body for supporting a first drive unit which includes a rotative drive device including a motor for rotatively driving the recording medium and a recording/playback head transfer device;
    a second support body for supporting a second drive unit having a retaining means for maintaining the magnetic head in contact with the recording medium;
    means for mounting said first and second support bodies to said frame for rotation about respective pivot points; and
    a synchronous driving mechanism for swingingly driving said first and second support bodies toward and away from each other about said respective pivot points to engage said drive units with said magnetic recording medium located at said predetermined position and to disengage said drive units from said magnetic recording medium, respectively.

5. The device according to claim 4, wherein said retaining means comprises a retaining plate.

6. The device of claim 4, wherein said driving mechanism comprises means for rotating one of said support bodies, and means for rotating the other of said support bodies in response to rotation of said one of said support bodies.

7. The device according to claim 4, wherein said synchronous drive mechanism comprises:
    a link member having one end thereof freely rotatably connected to one of said first support body and said second support body at a suitable location thereon, and having another end which undergoes linear motion along a predetermined path, thereby swinging said one of said first support body and said second support body; and
    a drive mechanism for reciprocating said another end of said link member linearly along the predetermined path.

8. The device according to claim 7, wherein said drive mechanism further comprises:
    a rack provided along said predetermined path;
    a pinion freely rotatably provided on said another end of said link member and meshing with said rack; and
    a rotative drive mechanism which includes a motor secured to said link member for rotatively driving said pinion.

9. An apparatus comprising:
    a moving body for moving between a recording medium loading/unloading position provided at a first predetermined position and a recording medium recording/playback position provided at a second predetermined position; and holding mechanisms arranged on said moving body at predetermined intervals for holding respective recording media in a freely loadable/unloadable state, said moving body and each of said holding mechanisms being formed to have a cut-away portion in such a manner that a portion of the recording media held by said respective holding mechanism is exposed to the outside at both surfaces thereof; and a drive unit comprising first and second members mounted at a predetermined location with respect to said moving body and arranged to each freely approach and separate said recording media from first and second surfaces, respectively, of a selected one of said holding means which has arrived at said second predetermined position for subjecting the recording media held to recording/playback, said first member having thereon means for effecting recording/playback said first surface when in contact therewith, and said second member having retaining means for contacting said second surface to maintain said first surface and said recording/playback means in contact, one of said members approaching and separating from one main surface of said disk-like recording media and the other of said members approaching and separating from the other main surface of said recording media.

10. The apparatus according to claim 9, wherein said moving body is a rotary disk on which said holding mechanisms are provided at predetermined angular intervals, said rotary disk having an outer circumferential edge formed to include arcuate cut-out portions at positions corresponding to said holding mechanisms.

11. The auto-changer according to claim 9, wherein said loading/unloading position and said recording/playback position are provided at the same position.

12. A recording/playback apparatus for subjecting a recording medium having one main surface on which information is recorded and a second main surface on a side of said medium opposite said first main surface, said apparatus comprising:

a moving body on which a plurality of holding means each holding a recording medium in a freely loadable and unloadable manner are fixedly arranged at predetermined intervals, for moving a selected recording medium between a loading/unloading position provided at a first predetermined position and a recording/playback position provided at a second predetermined position, a drive unit comprising first and second members mounted at a predetermined location with respect to said moving body and arranged to each freely approach and separate from said first and second surfaces, respectively, of a selected one of said holding means which has arrived at said second predetermined position for subjecting the recording medium held to recording/playback, said first member having thereon means for effecting recording/playback from said first surface when in contact therewith, and said second member having retaining means for contacting said second surface to maintain said first surface and said recording/playback means in contact, and means for moving said first member and said second member so that said recording/playback means contacts said first surface and said retaining means contacts said second surface.

* * * * *